United States Patent [19]

Kuriyama et al.

[11] Patent Number: 4,739,643
[45] Date of Patent: Apr. 26, 1988

[54] METHOD OF MANUFACTURING A DIAMOND COIL FOR A ROTATING ELECTRIC MACHINE

[75] Inventors: Kei Kuriyama; Masao Maeda; Sakuhei Ohashi, all of Amagasaki, Japan

[73] Assignee: Mitsubishi Denki Kabushiki Kaisha, Japan

[21] Appl. No.: 38,319

[22] Filed: Apr. 14, 1987

[30] Foreign Application Priority Data

Jun. 25, 1986 [JP] Japan .................. 61-148812

[51] Int. Cl.⁴ ............... H02K 15/04; B21D 53/00
[52] U.S. Cl. ............................ 72/306; 72/384; 72/371; 72/301; 72/415; 29/596; 29/598
[58] Field of Search ............ 72/306, 415, 371, 384, 72/388, 387, 295, 301; 29/596, 598

[56] References Cited

U.S. PATENT DOCUMENTS

| | | | |
|---|---|---|---|
| 1,789,128 | 1/1931 | Apple | 29/598 |
| 1,834,926 | 12/1931 | Apple | 29/598 |
| 1,860,977 | 5/1932 | Apple | 29/598 |
| 2,964,085 | 12/1960 | Ghiringhelli | 72/306 |
| 3,694,907 | 10/1972 | Margrain et al. | 29/598 |
| 4,030,172 | 6/1977 | Gentry | 72/384 |
| 4,450,708 | 5/1984 | King | 72/481 |
| 4,587,824 | 5/1986 | Wiersema et al. | 29/596 |

FOREIGN PATENT DOCUMENTS

| | | | |
|---|---|---|---|
| 41754 | 9/1981 | Japan . | |
| 160355 | 8/1985 | Japan . | |
| 180459 | 9/1985 | Japan | 29/596 |
| 183956 | 9/1985 | Japan . | |
| 27146 | 7/1916 | Norway | 72/388 |
| 941643 | 11/1963 | United Kingdom . | |
| 2126505 | 3/1984 | United Kingdom . | |

*Primary Examiner*—Daniel C. Crane
*Attorney, Agent, or Firm*—Leydig, Voit & Mayer

[57] ABSTRACT

A manufacturing method for a diamond coil for a rotating electric machine comprises bending a straight conductor in a first plane at eight points so as to produce coil leads, coil ends, and coil straight portions. The conductor is next twisted about its longitudinal axis so as to bend the coil ends out of the first plane. The conductor is then bent in two in a second plane, which is perpendicular to the first plane and which includes the longitudinal axis of the conductor, until the two leads of the conductor point in approximately the same direction.

4 Claims, 7 Drawing Sheets

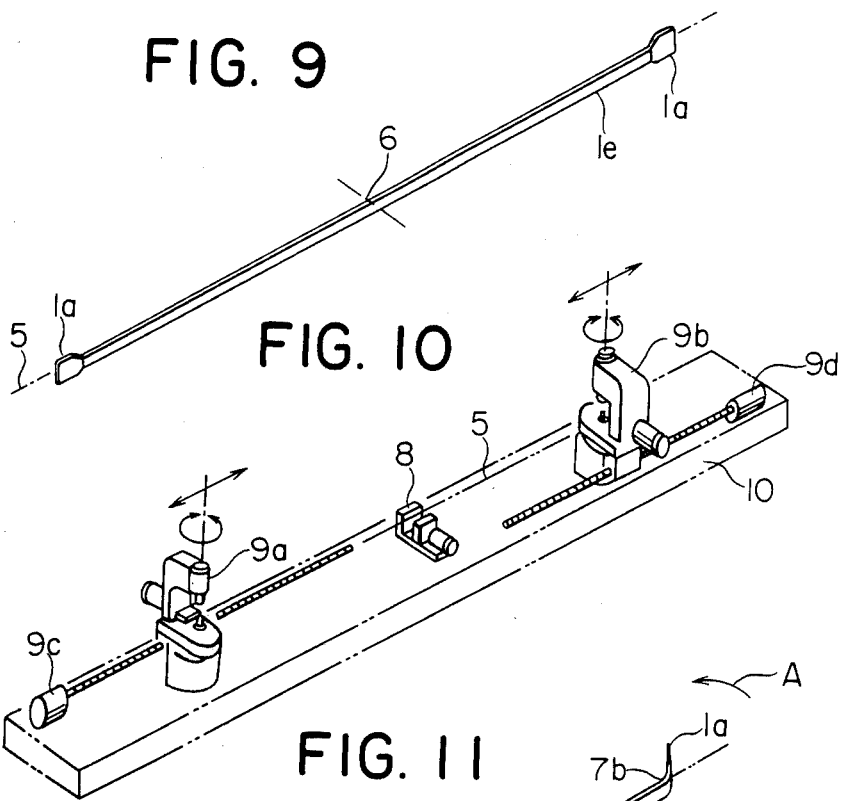

METHOD OF MANUFACTURING A DIAMOND COIL FOR A ROTATING ELECTRIC MACHINE

BACKGROUND OF THE INVENTION

This invention relates to a method of manufacturing a diamond coil for the rotor or stator of a rotating electric machine. More particularly, it relates to a coil manufacturing method which is suitable for automation.

FIG. 1 illustrates a typical diamond coil of the type to which the present invention pertains. As shown in the drawing, a diamond coil usually comprises a plurality of hexagonal strands 1. The two flattened ends of a strand 1 are usually referred to as leads 1a, while the portion at approximately the middle of a strand 1 which is bent in two is called the nose 1d. The sections forming the four sides of the strand 1 adjacent to the leads 1a and the nose 1d are referred to as coil ends 1b, while the sections connecting the coil ends 1b with one another are referred to as straight portions 1c.

A conventional method of manufacturing a diamond coil of the type shown in FIG. 1 consists of bending a plurality of conductors around a special coil form into the shape of a diamond. A coil form 2 used in this conventional method is illustrated in FIG. 2. As shown in FIG. 2, the coil form 2 has a roughly semicylindrical, wooden body to which are secured a nose block 2a and pin 2b for holding the nose 1d of a strand 1, four diagonal blocks 2c which serve as forms for the coil ends 1b, a plurality of holes 2e into which the pin portion of a bending tool 2d is inserted, and two straight blocks 2f which serve as forms for the straight portions 1c of a strand 1.

The process of forming a coil strand 1 using this coil form 2 is as follows. First, a conducting material is cut to a prescribed length and both ends thereof are flattened by rolling, thereby forming a conductor 1e with two leads 1a, as shown in FIG. 3. Next, as shown in FIG. 4, the conductor 1c is bent at approximately its midportion about a round pin 3a which fits into a cap 3b, thereby bending the conductor 1e into roughly the shape of a pine needle and producing a nose 1d. A plurality of identical conductors 1e which were formed in this manner are then combined and mounted on a coil form 2 with their noses 1d inserted into the nose block 2a of the coil form 2 in the manner shown in FIG. 5. The conductors 1e are secured in the coil form 2 by inserting a pin 2b into the nose block 2a so as to pass through the nose 1d of each conductor 1e. The conductors 1e are then divided into two bundles, one of the bundles containing one end of each conductor 1e and the other bundle containing the other end of each conductor 1e. The two bundles of conductors 1e are bent outwards in opposite directions as shown by the arrows in FIG. 5 until they contact the diagonal blocks 2c. At the same time, the bundles are pressed flat against the surface of the coil form 2.

Next, as shown in FIG. 6, a bending tool 2d is inserted into one of the holes 2e so as to grasp one bundle of conductors 1e, and this bundle is bent using the bending tool 2d until it contacts one of the straight blocks 2f. The other bundle is bent in the same manner. The bending tool 2d is then inserted into another hole 2e which is closer to the leads 1a than the previously-described hole 2e, one of the bundles is grasped by the bending tool 2d, and the bundle is bent until it contacts one of the diagonal blocks 2c at the end of the coil form which is remote from the nose block 2a, after which the bundle is pressed against the surface of the coil form 2. The other bundle of conductors 1e is bent in the same manner, after which the conductors 1e appear as shown in FIG. 7. Last, as shown in FIG. 8, each of the leads 1a is bent into a prescribed position using another bending tool 4, and a coil like that shown in FIG. 1 is obtained.

The above-described conventional manufacturing method has a number of drawbacks. First, the dimensions of a coil form 2 are fixed, and a given coil form 2 can be used only for the manufacture of a coil having a certain size. If it is desired to manufacture a coil having slightly different dimensions, a completely different coil form 2 is necessary. Furthermore, it is difficult to achieve good dimensional accuracy with this method. Most importantly, since the coil form 2 has a curved, three-dimensional shape, bending takes place in a large number of planes, making it extremely difficult to perform the above-described bending steps using simple machinery. As a result, only a few of the manufacturing steps have been mechanized, the great majority must be performed by hand, and accordingly this conventional manufacturing method is inefficient.

SUMMARY OF THE INVENTION

It is therefore an object of the present invention to provide a manufacturing method for a diamond coil which can be completely automated using simple machinery.

It is another object of the present invention to provide a manufacturing method for a diamond coil which enables coils to be manufactured with good dimensional accuracy.

In a manufacturing method according to the present invention, a plurality of conductors are individually formed into individual, diamond-shaped strands, after which the individual strands are combined to form a diamond coil. The process of forming a conductor into a diamond-shaped strand is divided into a number of simple bending steps, the majority of the bending steps involving bending in only a single plane. Since bending is largely confined to a single plane, it is possible to perform the bending automatically employing very simple machinery, thus making it easy to automate the entire manufacturing process.

A manufacturing method for a diamond coil according to the present invention comprises three bending steps. The first bending step consists of producing eight bends at eight points along a straight conductor by bending the conductor in a first plane containing the straight conductor so as to produce the coil leads, the coil ends, and the straight portions of the coil. The second bending step consists of twisting the two halves of the conductor about the longitudinal axis of the conductor so as to give the coil ends a prescribed curvature, and the third bending step consists of bending the conductor in two about its center in a second plane which is perpendicular to the first plane and which contains the longitudinal axis of the conductor.

BRIEF DESCRIPTION OF THE DRAWINGS

FIG. 9 is a perspective view of a conductor for use in the manufacturing method of the present invention, showing the shape of the conductor prior to bending.

FIG. 10 is a perspective view of a bending apparatus for use in a first embodiment of a manufacturing method according to the present invention.

FIGS. 11 through 14 are perspective views of the conductor of FIG. 9, showing its shape at various stages of manufacture employing the first embodiment of the present invention.

In the drawings, the same reference numerals indicate the same or corresponding parts.

DESCRIPTION OF THE PREFERRED EMBODIMENTS

Figure 1:
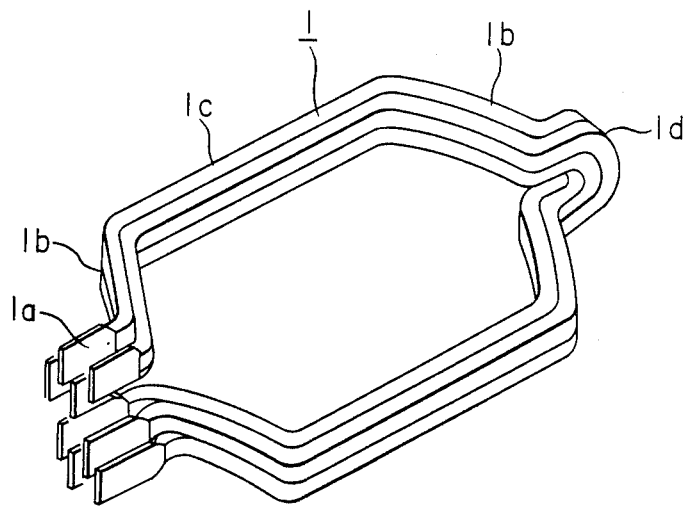
FIG. 1 is a perspective view of a conventional diamond coil of the type to which the present invention pertains.
Figure 2:
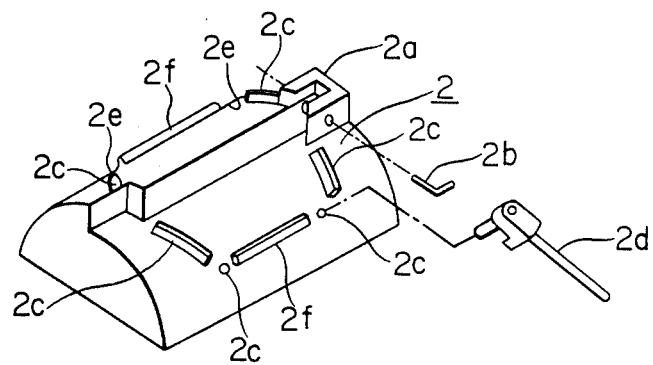
FIG. 2 is a perspective view of a conventional coil form used in a conventional manufacturing method for a diamond coil.
Figure 3:
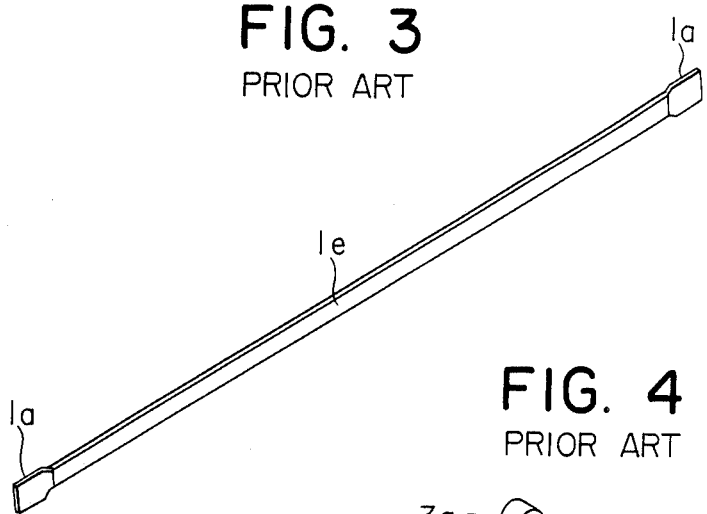
FIGS. 3 through 8 are explanatory perspective views of the various stages in the manufacture of a diamond coil in accordance with a conventional method using the coil form of FIG. 2.
Figure 4:
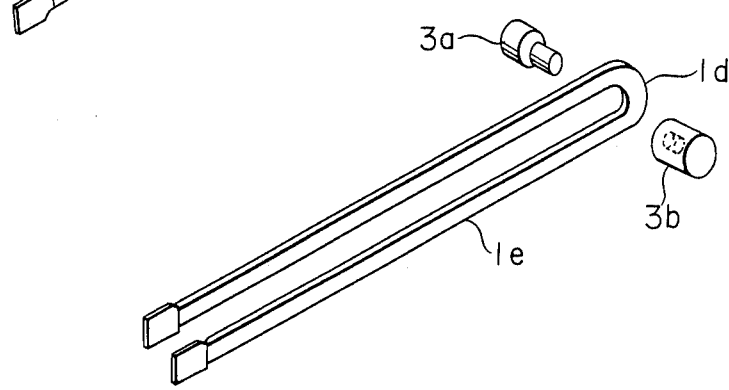
Figure 5:
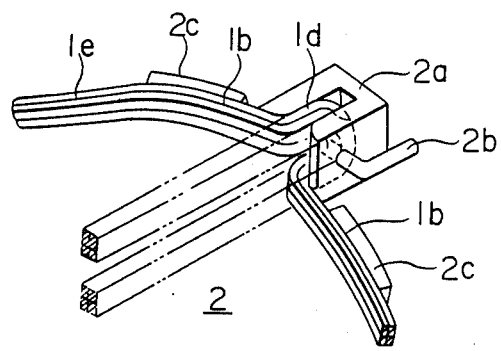
Figure 6:
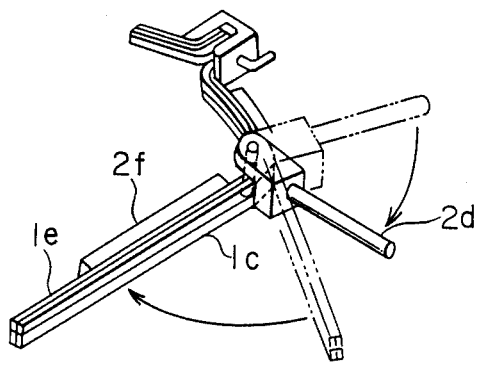
Figure 7:
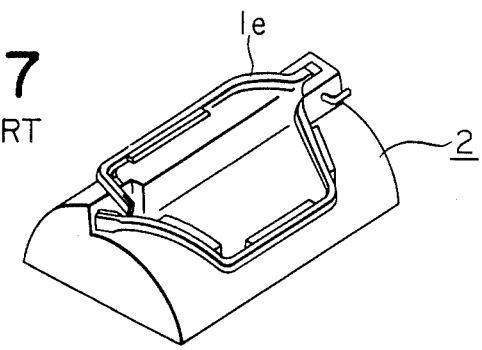
Figure 8:
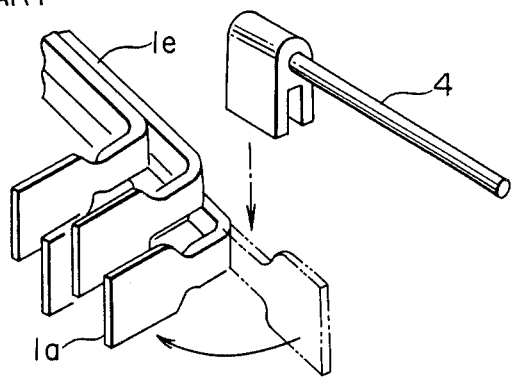

A number of preferred embodiments of a manufacturing method in accordance with the present invention will now be described while referring to the accompanying drawings, of which FIGS. 9 through 18 illustrate the manufacturing steps in a first embodiment. First, a conductor $1e$ like that shown in FIG. 9, which is to be formed into a coil strand, is prepared by the conventional method of cutting a conducting material into a prescribed length and rolling the two ends to form leads $1a$. A reference point 6 located at a suitable distance from each end of the conductor $1e$ is then selected. Next, bending of the conductor $1e$ is a single plane is performed using the planar bending apparatus shown in FIG. 10. This planar bending apparatus has a stationary clamp 8 which is secured to a flat, horizontal base 10 and two bending mechanisms $9a$ and $9b$ which are able to bend a conductor $1e$ in a plane which is parallel to the top surface of the base 10. The two bending mechanism $9a$ and $9b$ are connected to two longitudinally-extending conveyor mechanisms $9c$ and $9d$, respectively, which can move the bending mechanisms $9a$ and $9b$ parallel to the longitudinal axis of the base 10.

A single conductor $1e$ is mounted in this planar bending apparatus with its longitudinal axis 5 extending parallel to the longitudinal axis of the block 10, as shown in FIG. 10. The conductor $1e$ is secured by the clamp 8 with the reference point 6 positioned at the center of the clamp 8, which grasps the conductor $1e$ by the front and rear surfaces of the conductor $1e$ so that these two surfaces are vertically disposed. The two bending mechanisms $9a$ and $9b$ are then moved by the conveyor mechanisms $9c$ and $9d$, respectively, towards the opposite ends of the conductor $1e$ to a first point $7a$ and a second point $7b$, respectively, which are located near the ends at prescribed distances from the reference point 6. The ends of the conductor $1e$ are bent by the bending mechanisms $9a$ and $9b$ about the first point $7a$ and the second point $7b$, respectively, in the same rotational direction, which will be referred to as a first rotational direction and which is indicated by the arrows marked A in FIG. 11. The two ends are bent by a prescribed angle of at most 90 degrees.

Figure 13:
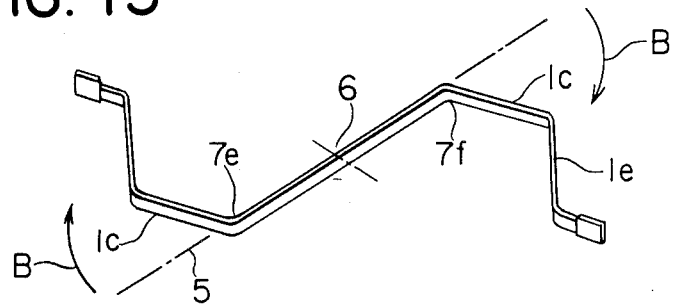
Figure 14:
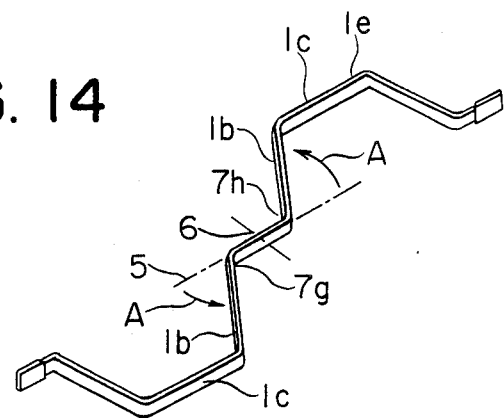

Next, the two bending mechanisms $9a$ and $9b$ are moved towards the reference point 6 along the axis 5 of the conductor $1e$ to a third point $7c$ and a fourth point $7d$, respectively, which are closer to the reference point 6 than the first point $7a$ and the second point $7b$. The conductor $1e$ is then bent by the bending mechanisms $9a$ and $9b$ about the third point $7c$ and the fourth point $7d$ by a prescribed angle of at most 90 degrees in a second rotational direction, indicated by the arrows marked B in FIG. 12, which is the opposite of the first rotational direction. This bending step produces two coil ends $1b$. Next, the two bending mechanisms $9a$ and $9b$ are moved along the axis 5 of the conductor $1e$ in the direction of the reference point 6 to a fifth point $7e$ and a sixth point $7f$, respectively, which are located at prescribed distances from the reference point 6 and which are closer to the reference point 6 than the third point $7c$ and the fourth point $7d$. As shown in FIG. 13, the conductor $1e$ is then bent by the bending mechanisms around the fifth point $7e$ and the sixth point $7f$ in the second rotational direction by a prescribed angle of at most 90 degrees, thereby forming two straight portions $1c$. The bending mechanisms $9a$ and $9b$ are again moved along the axis 5 of the conductor $1e$ to a seventh point $7g$ and an eighth point $7h$, respectively, which are still closer to the reference point 6 and are separated therefrom by prescribed distances. As shown in FIG. 14, the conductor $1e$ is then bent by the bending mechanisms in the first rotational direction about the seventh point $7g$ and the eighth point $7h$ by at most 90 degrees, thereby forming two more coil ends $1b$. During each of the above bending steps performed by the bending mechanisms $9a$ and $9b$, the centerline of the conductor $1e$ remains in a single horizontal plane which is parallel to the top surface of the base 10 of the bending apparatus.

Figure 15:
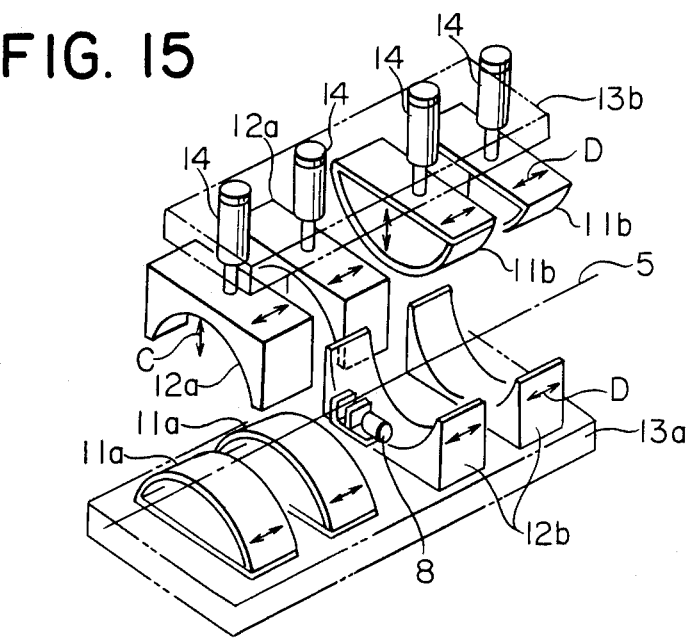
FIG. 15 is a perspective view of a coil end bending apparatus for use in the present invention.

The conductor $1e$ is then transferred from the planar bending apparatus of FIG. 10 to the coil end bending apparatus shown in FIG. 15. The purpose of this apparatus is to twist the two halves of the conductor $1e$ with respect to each other about the longitudinal axis 5 of the conductor $1e$ so as to give the coil ends $1b$ a prescribed curvature. The coil end bending apparatus has a clamp 8 which is secured to a lower base $13a$. On opposite sides of the clamp 8, the lower base $13a$ movably supports two identical lower convex forms $11a$ and two identical lower concave forms $12b$ which can be moved by unillustrated means in the longitudinal direction of the lower base $13a$, thereby enabling the apparatus to be used for conductors $1e$ of various dimensions. An upper base $13b$ supports two upper convex forms $11b$ having shapes which are complementary to those of the lower concave forms $12b$, and two upper concave forms $12a$ whose shapes are complementary to those of the lower convex forms $11a$. The upper forms $11b$ and $12a$ are connected to the upper base $13b$ by pistons 14 which can move the upper forms $11b$ and $12a$ vertically in the direction of arrow C and can press the upper forms $11b$ and 12a firmly against the lower forms 12b and 11a, respectively. Like the lower forms 12b and 11a, the upper forms 11b and 12a and the pistons 14 are supported so as to be movable in the longitudinal direction of the upper base 13b, as shown by arrow D, so that they can be positioned directly above the corresponding lower forms.

The conductor 1e of FIG. 14 is mounted in the bending apparatus of FIG. 15 with its longitudinal axis extending down the length of the apparatus. The central portion of the conductor 1e is secured by the clamp 8 with the reference point 6 located at the center of the clamp 8. One of the straight portions 1c of the conductor 1e rests on the lower covex forms 11a, while the other straight portion 1c rests on the lower concave forms 12b. The upper forms 11b and 12a are then lowered by the pistons 14 and pressed against the lower forms 12b and 11a, respectively. This pressing action causes the two halves of the conductor 1e to twist with respect to one another about the longitudinal axis 5. The twisting action plastically bends the coil ends 1b out of the horizontal plane containing the longitudinal axis 5 of the conductor 1e and gives the coil ends 1b a prescribed curvature. The resulting conductor 1e appears as shown in FIG. 16.

Figure 16:
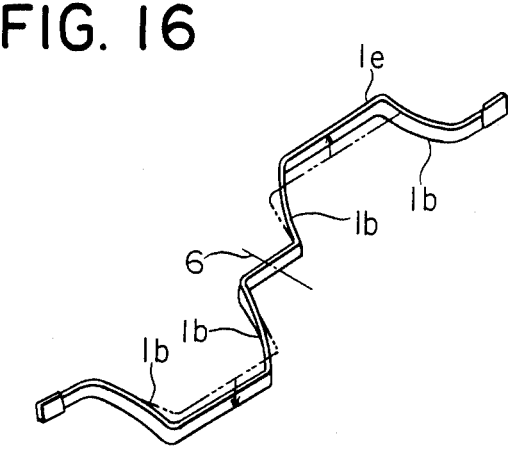
FIG. 16 is a perspective view of the conductor of FIG. 15 after it has been shaped by the coil end bending apparatus of FIG. 15.
Figure 17:
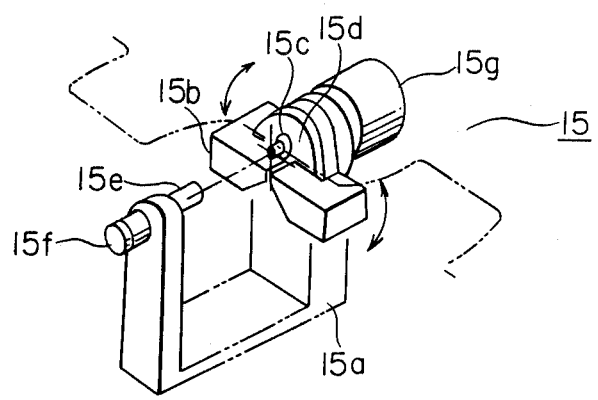
FIG. 17 is a perspective view of a nose bending apparatus for use in the present invention.

Next, the coil nose 1d of the conductor 1e is formed using the nose bending apparatus 15 of FIG. 17. The nose bending apparatus 15 has a base 15a which supports a pair of pivoting wings 15b. The conductor 1e of FIG. 16 is placed on the wings 15b in the manner shown by the dashed line in FIG. 17 with the reference point 6 being positioned directly below a stationary pin 15c. The central portion of the conductor 1e is pressed firmly against a stationary vertical plate 15d by a cap 15e which fits over the pin 15c. The cap 15e can be moved in the longitudinal direction of the apparatus 15 and pressed against the conductor 1e by a piston 15f which is secured to one end of the base 15a. The two wings 15b can be rotated towards and away from one another about the longitudinal axis of the apparatus 15, as shown by the curved arrows in the figure, by an electric motor 15g which is secured to the opposite end of the base 15a.

Figure 18:
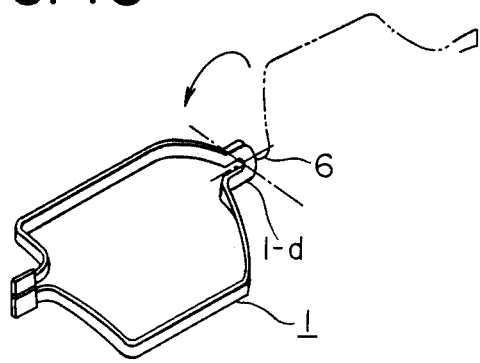
FIG. 18 is a perspective view of the conductor of FIG. 16 after it has been shaped by the nose bending apparatus of FIG. 17.

After the conductor 1e of FIG. 16 has been mounted on the wings 15b and restrained against the vertical plate 15d by the cap 15e, the electric motor 15g is operated to pivot the wings 15b towards one another. As a result, the central portion of the conductor 1e is wrapped around the pin 15c of the bending apparatus 15, and the conductor 1e is bent in two until the coil leads 1a extend in approximately the same direction. This bending produces a nose 1d, and a completed coil strand 1 having the shape shown in FIG. 18 is obtained. A plurality of these coil strands 1 can then be combined with one another by a conventional method to obtain a diamond coil like that shown in FIG. 1.

If the planar bending apparatus of FIG. 10, the coil end bending apparatus of FIG. 15, and the nose bending apparatus 15 of FIG. 17 are connected with one another by an automatic conveyor which can transfer a conductor 1e from one bending apparatus to the next, the manufacture of a coil using the present method can be completely automated.

Figure 19:
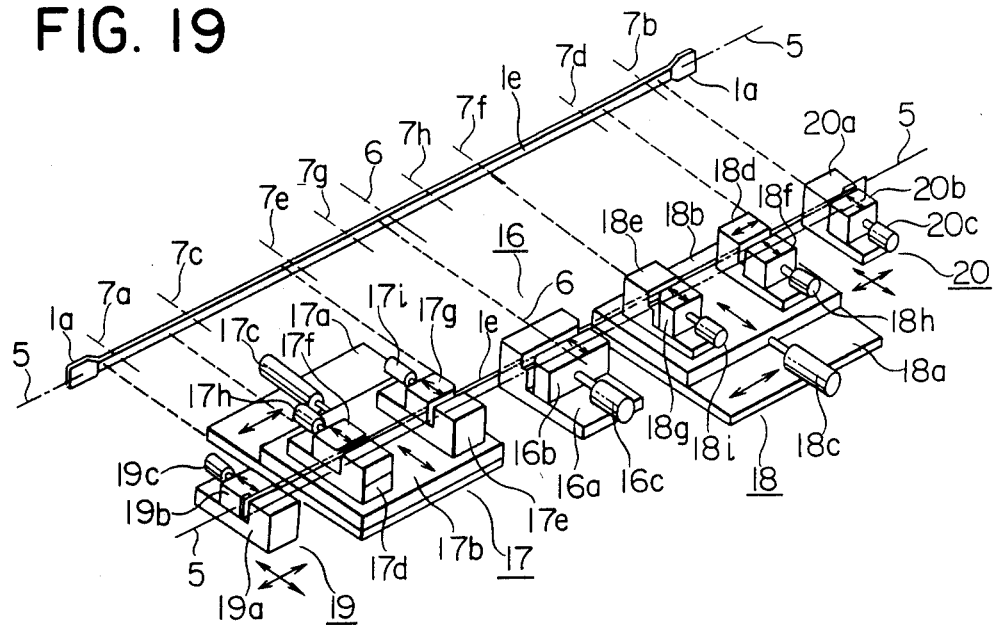
FIG. 19 is a perspective view of a bending apparatus for use with a second embodiment of the present invention, showing the state of the apparatus prior to operation.

In the previous embodiment, the four bending steps illustrated in FIGS. 11 through 14 are performed one at a time. In a second embodiment of the present invention, however, these bending steps are performed simultaneously. FIG. 19 is a perspective view of a bending apparatus for use in carrying out this second embodiment. At the center of this bending apparatus is a first clamping mechanism 16 comprising a stationary base 16a, a movable jaw 16b, and a piston 16c which opens and closes the movable jaw 16b.

On opposite sides of the first clamping mechanism 16 are a second clamping mechanism 17 and a third clamping mechanism 18 which are respectively equipped with axially-sliding bases 17a and 18a which can be moved in the direction parallel to the longitudinal axis 5 of a conductor 1e mounted in the bending apparatus by suitable unillustrated means. The axially-sliding bases 17a and 18a support perpendicularly-sliding bases 17b and 18b, respectively, which are supported so as to move in the axial direction together with the axially-sliding bases 17a and 18a but so as to be able to move atop the bases 17a and 18a in the direction perpendicular to the longitudinal axis 5. The perpendicularly-sliding bases 17b and 18b are moved in the perpendicular directions by pistons 17c and 18c which are secured to the axially-sliding bases 17a and 18a, respectively. Perpendicularly-sliding base 17b supports two sliding clamps 17d and 17e which move together with perpendicularly-sliding base 17b in the perpendicular direction but which can be moved in the axial direction with respect to perpendicularly-sliding base 17b by unillustrated means. The sliding clamps 17d and 17e have movable jaws 17f and 17g which can be opened and closed by pistons 17h and 17i which are secured to sliding clamp 17d and sliding clamp 17e, respectively. Similarly, perpendicularly-sliding base 18b supports two sliding clamps 18d and 18e having basically the same structure as sliding clamps 17d and 17e, being equipped with movable jaws 18f and 18g and pistons 18h and 18i, respectively.

A fourth clamping mechanism 19 and a fifth clamping mechanism 20 for grasping the ends of a conductor 1e are disposed at opposite ends of the apparatus. The fourth clamping mechanism 19 comprises a sliding base 19a which can be moved by unillustrated means in both the axial and the perpendicular directions, a sliding jaw 19b, and a piston 19c which is secured to the sliding base 19a and is used for opening and closing the jaw 19b. The fifth clamping mechanism 20 has a similar structure, comprising a sliding base 20a, a movable jaw 20b, and a piston 20c.

As in the first embodiment, a conductor 1e to be shaped into a coil strand 1 has a reference point 6 at approximately its center and first through eighth points 7a–7h, respectively, which are the points at which bending of the conductor 1e takes place. A conductor 1e has been drawn alongside the bending apparatus of FIG. 19 in order to illustrate the positions of the various parts of the bending apparatus relative to the various portions of the conductor 1e.

At the start of processing, a conductor 1e is mounted in the bending apparatus of FIG. 19 with the reference point 6 aligned with the center of the first clamping mechanism 16. All of the clamping mechanisms are initially aligned so that when all the movable jaws are closed and the conductor 1e is securely held thereby, the conductor 1e will remain perfectly straight. Furthermore, the clamping mechanisms are positioned along the length of the conductor 1e such that the first point 7a of the conductor 1e lies along the inner edge (the one closest to the reference point 6) of the fourth clamping mechanism 19; the second point 7b lies along the inner edge of the fifth clamping mechanism 20; the third point 7c and the fourth point 7d lie along the outer edges (the ones remote from the reference point 6) of sliding clamp 17d and sliding clamp 18d, respectively; the fifth point 7e and the sixth point 7f lie along the inner edges of sliding clamp 17e and sliding clamp 18e, respectively; and the seventh point 7g and the eighth point 7h lie along opposite edges of the first clamping mechanism 16.

Figure 20:
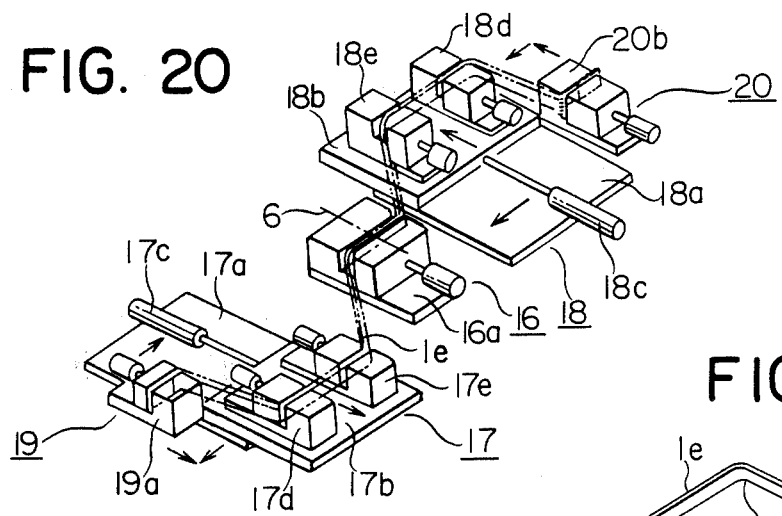
FIG. 20 is a perspective view showing the final state of the bending apparatus of FIG. 19.
Figure 21:
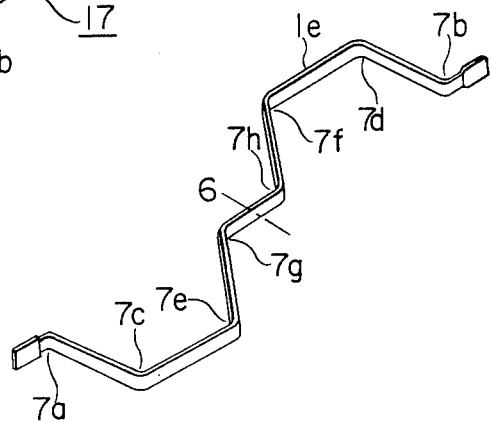
FIG. 21 is a perspective view of a conductor $1e$ after it has been bent by the bending apparatus of FIG. 20.

After the conductor 1e is secured by the clamping mechanisms, the sliding bases 17a, 17b, 17b, 18a, 18b, 19a, and 20a are moved from the initial positions shown in FIG. 19 to the positions shown in FIG. 20 in the directions of the arrows in that figure. Each of sliding bases 17a, 17b, 18a, and 18b moves either parallel or perpendicular to the longitudinal axis 5 of the conductor 1e, while sliding bases 19a and 20a move in both directions. The motion parallel to the longitudinal axis 5 of the conductor 1e is carried out in order to prevent the portions of the conductor 1e between the clamping mechanisms from being stretched by the movement perpendicular to the longitudinal axis 5. The motion of the sliding bases is automatically controlled by a computer or other suitable means. As a result of this movement of the clamping mechanisms, the conductor 1e is bent into the shape shown in FIG. 21. This shape is identical to the shape of the conductor 1e in FIG. 14, after carrying out the first four bending steps of the first embodiment. The subsequent manufacturing steps are identical to those in the first embodiment. Namely, the coil ends 1b of the conductor 1e of FIG. 21 are bent using the coil end bending apparatus of FIG. 15, after which a nose 1d is formed using the nose bending apparatus 15 of FIG. 17 to obtain a finished coil strand 1 like that shown in FIG. 18. A plurality of such coil strands 1 are then assembled by a conventional method to obtain a diamond coil like that shown in FIG. 1.

Preferably, the bending apparatus of FIG. 19 is connected with the coil end bending apparatus of FIG. 15 and the nose bending apparatus 15 of FIG. 17 by an automatic conveyor which can transfer a conductor 1e from one apparatus to the next so that the entire manufacturing process can be automated.

In the bending apparatus of FIG. 19, it is not necessary that the first clamping mechanism 16 remain stationary. It is only necessary that the five clamping mechanisms 16-20 move with respect to one another by proper amounts in the directions parallel and perpendicular to the longitudinal axis 5 of the conductor 1e so as to produce the desired bends in the conductor 1e. Thus, a different one of the clamping mechanisms could be maintained stationary while the other clamping mechanisms are moved with respect thereto.

The bending apparatuses illustrated in FIGS. 10, 15, 17, and 19 are designed so as to securely grasp a conductor 1e during bending, and accordingly good dimensional accuracy can be obtained. Furthermore, each apparatus is adjustable so that it can be used to form coil strands having greatly differing dimensions.

As can be seen from the above description, because the bending steps of the present invention are largely confined to a single plane, the manufacture of a coil can be completely automated using very simple apparatuses. The apparatuses for carrying out the method of the present invention need not be identical to the apparatuses illustrated in the drawings. For example, the planar bending apparatus of FIG. 10 has two bending mechanisms 9a and 9c which are capable of moving only parallel to the longitudinal axis of the base 10. However, a planar bending apparatus could be used which has two bending mechanisms, each of which is capable of moving both parallel to and perpendicular to the longitudinal axis of a conductor. Such a bending apparatus would have the advantage that the four bending steps shown in FIGS. 11 through 14 could be performed in any desired order.

What is claimed is:

1. A manufacturing method for a diamond coil comprising:

a first bending step of bending a straight conductor in a first plane containing the longitudinal axis of said conductor at eight points along the length of said conductor so as to produce eight bends, each of said bends being of at most 90 degrees, the portions of said conductor between adjacent points remaining straight, said eight points comprising a first and a second point which lie on either side of a reference point, a third point which lies between said first point and said reference point, a fourth point which lies between said second point and said reference point, a fifth point which lies between said third point and said reference point, a sixth point which lies between said fourth point and said reference point, a seventh point which lies between said fifth point and said reference point, and an eighth point which lies between said sixth point and said reference point;

a second bending step following said first bending step of twisting said conductor about the longitudinal axis of said conductor so as to bend the portion between said first and third points and the portion between said fifth and seventh points out of said first plane in a direction which is normal to said first plane and so as to bend the portion between said second and fourth points and the section between said sixth and eighth points out of said first plane in the opposite direction; and a third bending step following said second bending step of bending said conductor in two about said reference point in a second plane which is perpendicular to said first plane and which contains the longitudinal axis of said conductor until the opposite ends of said conductor point in approximately the same direction.

2. A manufacturing method as claimed in claim 1, wherein said first bending step comprises:

bending said conductor in a first rotational direction by an angle of at most 90 degrees about said first and second points in said first plane while maintaining the portion of said conductor between said first and second points stationary;

bending said conductor in a second rotational direction which is the opposite of said first rotational direction by an angle of at most 90 degrees in said first plane about said third point and said fourth point while maintaining the portion of said conductor between said third and fourth points stationary;

bending said conductor in said first plane in said second rotational direction by an angle of at most 90 degrees about said fifth point and said sixth point while maintaining the portion of said conductor between said fifth and sixth points stationary and bending said conductor in said first plane in said first rotational direction by an angle of at most 90 degrees about said seventh point and said eighth point while maintaining the portion of said conductor between said seventh and eighth points stationary.

3. A manufacturing method as claimed in claim 1, wherein said first bending step comprises:

clamping the portion of said conductor between said seventh and eight points with a first clamping mechanism;

clamping the portion of said conductor between said third and fifth points with a second clamping mechanism;

clamping the portion of said conductor between said fourth and sixth points with a third clamping mechanism:

clamping the portion of said conductor between said first point and the end of said conductor nearest thereto with a fourth clamping mechanism;

clamping the portion of said conductor between said second point and the end of said conductor nearest thereto with a fifth clamping mechanism; and moving said first through fifth clamping mechanisms with respect to one another in said first plane in a direction perpendicular to the longitudinal axis of said conductor so as to bend said conductor at said eight points.

4. A manufacturing method as claimed in claim 3, wherein said first bending step further comprises moving said first through fifth clamping mechanisms with respect to one another in said first plane in a direction parallel to the longitudinal axis of said conductor simultaneous with said movement perpendicular to said longitudinal axis so as to prevent the elongation of the portions of said conductor between adjacent clamping mechanisms.

* * * * *